Feb. 4, 1969 S. J. NISKIN 3,425,664
SLIDE VALVE
Filed Dec. 30, 1965
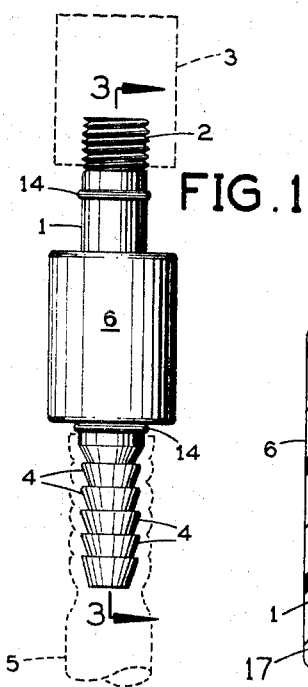
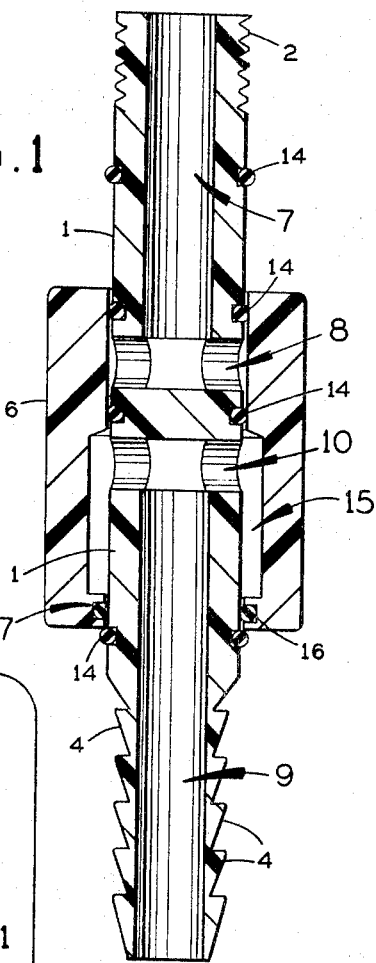
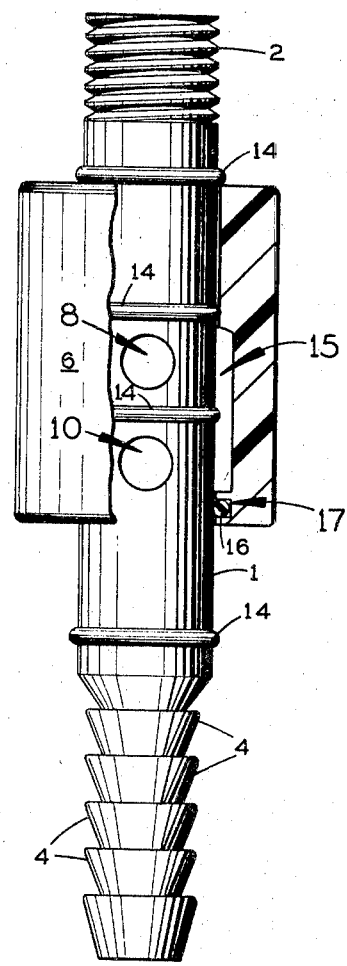
FIG. 1
FIG. 2
FIG. 3
FIG. 4
INVENTOR.
SHALE J. NISKIN
BY
Lloyd J. Andres

United States Patent Office 3,425,664
Patented Feb. 4, 1969

3,425,664
SLIDE VALVE
Shale J. Niskin, 9400 SW. 63rd Court,
Miami, Fla. 33156
Filed Dec. 30, 1965, Ser. No. 518,767
U.S. Cl. 251—344                                    1 Claim
Int. Cl. F16k 3/26, 27/04; E03b 7/07

ABSTRACT OF THE DISCLOSURE

A variable slide valve in which a cylindrical conduit is provided with two cross orifices. A slidable sleeve is fitted on the conduit and the sleeve has an internal passageway which can be moved from closed to open position to bridge the two orifices and permit fluid to flow through the conduit. O-rings are provided to seal and provide stops for the sleeve.

---

This invention relates in general to valves for controlling the flow of fluids and more particularly to a ported slide valve for controlling the volumetric flow of liquid or gas in a conduit means.

Valves of the general gate, poppet, or slide and spool variety, prior to the present invention, are generally comprised of complicated assemblies of a number of elements which necessarily require precision machining and resultant high cost. Furthermore, valves of the aforesaid type are prone to leak and in some instances require considerable servicing, including frequent adjustment and repacking of the seals therein.

The present invention overcomes the above objections and disadvantages by the provision of a relatively simple two part ported selective flow slide valve which is relatively simple and adapted to low cost manufacture and subject to long, useful life, which construction is a principle feature of the invention.

Another object of the invention is the provision of a ported slide valve having a pair of effective quick-replaceable seals therein including one pair of replacement seals thereon normally serving as stops for the slide member.

Another object of the invention is the provision of a ported slide valve with the elements thereof adapted for plastic molding including at least one member made of transparent material for the visual observation of a fluid flowing therethrough.

These and other objects and advantages in one embodiment of the invention are described and shown in the appended specification and drawing, in which:

FIG. 1 is a side view of the valve.

FIG. 2 is an exploded view of the valve shown in FIG. 1.

FIG. 3 is an enlarged cross sectional view taken through section line 3—3, FIG. 1.

FIG. 4 is an enlarged view of the valve shown in FIG. 1 in changed position with a portion thereof broken away.

Referring to FIGS. 1 and 2, and in this embodiment of the valve, a cylindrical tubular body member 1, preferably but not necessarily of plastic material, is provided with a threaded inlet end 2 for attachment to a conduit or other source of fluid 3. The opposite end portion of the body 1 is provided with a plurality of barbs 4 for retaining a hose or flexible tubing 5.

A cylindrical slide member 6, likewise preferably but not necessarily made of plastic material, has a coaxial bore therethrough and is positioned for predetermined slidable axial movement on the central portion of body 1.

Referring to FIG. 3, a coaxial inlet bore 7 terminates in a lateral cross-bore 8 forming a pair of inlet ports in the outer periphery of the body 1. A coaxial outlet bore 9 in the opposite end portion of body 1 terminates in a lateral cross-bore 10 forming a pair of outlet ports in opposite sides of body 1 in predetermined spaced relation with respect to the aforesaid inlet ports.

Referring to FIGS. 2 and 3, the body 1 is provided with a pair of peripheral grooves 11 on each side of the inlet bore 8 and also provided with a peripheral groove 12 adjacent the threaded end 2 thereof and another like groove 13 adjacent the barbed end thereof. Each of the aforesaid grooves is adapted to retain under predetermined tension a like resilient O ring 14, of elastomer material, which are positioned in the grooves, as shown in FIG. 3. The slide member 6 in FIG. 3 is in its "off" position with the normal bore therein in frictional engagement with the pair of O rings at opposite sides of the inlet bore 8.

The slide member is provided with a counter-bore 15, as shown, forming an internal peripheral passageway. The counter-bore 15 therein is sealed to body 1 by an O ring 16 retained in internal groove 17.

The O rings 14 positioned adjacent to the threaded end 2 and the barbed end 4, respectively, serve as stops for limiting the slide movement of member 6 when moved in either direction.

In operation and referring to FIG. 4, the valve is shown in its open or "on" position with the slide member moved against the upper stop ring with the counter-bore 15 in the slide member straddling each opposite orifice of the cross-bores 8 and 10 thus providing for a fluid flow channel through inlet bore 7 and from each orifice of the cross-bore 8 and into and through counter-bore 15 and then into the opposite orifices of cross-bore 10 into outlet bore 9.

It is now apparent that various degrees of fluid flow through the valve may be accomplished by various longitudinal settings of the slide member 6 along the body until the normal bore in slide member 8 is positioned over the orifices at each side of cross-bore 8 which corresponds to the closed or "off" position of the valve.

It is to be noted that for modest pressure the O ring seals may be eliminated by substituting a slide member made from slightly resilient material, such as polyethylene, with the diameter of the normal bore in the member made slightly less than the diameter of the body.

It is also to be noted that the cross sectional shape of the aforesaid orifices may be modified from the circular shape shown to accomplish predetermined gradients of flow with respect to the position of the slide member on the body.

It is also apparent that when the active O rings 14 adjacent the inlet bore 8 become worn they may be interchanged with the stop O rings 14 for conveniently extending the useful life of the device.

It is to be understood that certain modifications in the above construction utilizing the features described are intended to come within the scope of the appended claims.

Having described my invention, I claim:

1. A slide valve for fluids comprising a cylindrical body having coupling means at opposite ends thereof, said body having a coaxial inlet bore in one end portion thereof terminating in a cross-bore normal to the axis of said body forming a pair of opposite inlet ports, said body having a coaxial outlet bore in the opposite end portion thereof terminating in a second cross-bore normal to the axis of said body forming a pair of opposite outlet ports spaced a predetermined distance from said inlet ports, a slide member having main bore therethrough for axial reciprocation on said body in close frictional proximity therewith from a "closed" to an "open" position, said member having an internal counterbore in one end portion of said member with a diameter larger than said main bore and straddling said inlet and outlet ports when said member is in said "open" position for completing a fluid path through said body whereby said main bore will move over said inlet ports when said member is moved to said "closed" position for stopping the flow of said fluid through said valve, a pair of peripheral grooves around the outside of said body with one of said grooves at each side of said inlet ports including an elastomer O-ring retained in each said groove in slidable sealing engagement with the said main bore of said member for sealing said input ports and the inner side of said counterbore and an internal peripheral groove in said main bore of said member adjacent the outer side of said counterbore including a second size elastomer O-ring retained therein in slidable sealing engagement with said body for sealing the outer side of said counterbore, a further peripheral groove on the outside of said body being located on each side of said cross-bores, an O-ring in each of said grooves to provide stops for said slide member when the latter is moved in either direction along said cylindrical body whereby the open and close positions can be selected by moving said slide member against said O-rings in the peripheral grooves.

References Cited

UNITED STATES PATENTS

| | | | |
|---|---|---|---|
| 2,894,393 | 7/1959 | Koelle | 251—345 XR |
| 3,038,495 | 6/1962 | Fortin | 137—559 |
| 3,039,463 | 6/1962 | Dickey et al. | 251—345 XR |
| 3,127,149 | 3/1964 | Cruse | 251—344 XR |

FOREIGN PATENTS

| | | |
|---|---|---|
| 786,419 | 11/1957 | Great Britain. |

HENRY T. KLINSIEK, *Primary Examiner.*